June 26, 1962 L. N. LEUM ETAL 3,041,270
PRODUCT DISTRIBUTION IN HYDROCARBON
CATALYTIC CRACKING PROCESSES
Filed March 1, 1960
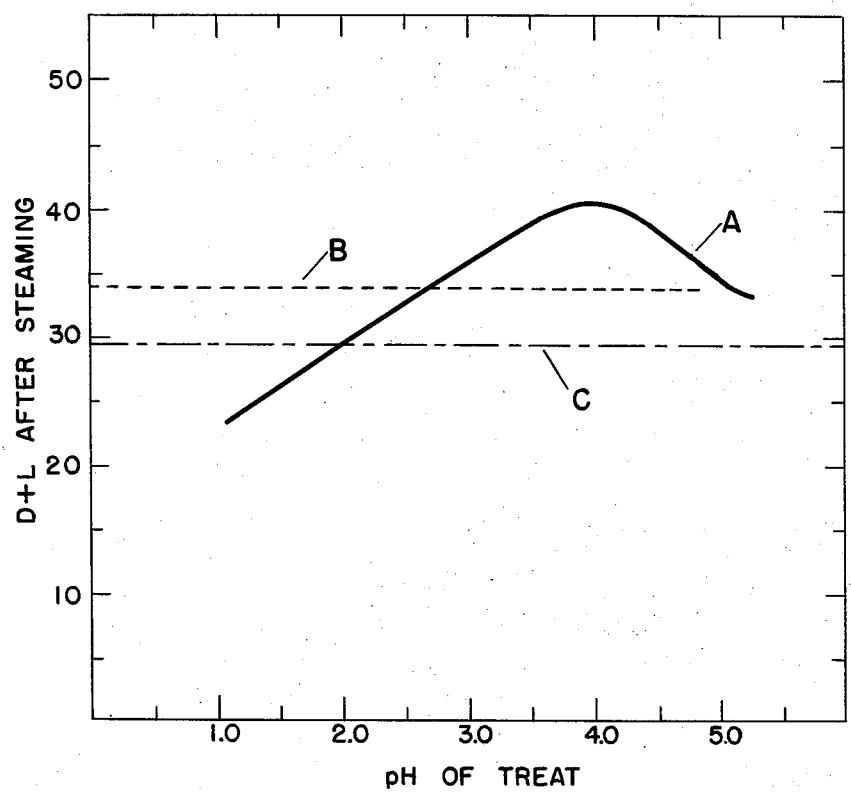
LEONARD N. LEUM
JAMES E. CONNOR, JR.
JOHN J. ROTHROCK
CLIFFORD S. SHIPLEY
INVENTORS
BY Norbert E. Birch
ATTORNEY

United States Patent Office 3,041,270
Patented June 26, 1962

---

3,041,270
PRODUCT DISTRIBUTION IN HYDROCARBON CATALYTIC CRACKING PROCESSES
Leonard N. Leum, Media, James E. Connor, Jr., Drexel Hill, John J. Rothrock, Ambler, and Clifford S. Shipley, Aldan, Pa., assignors to The Atlantic Refining Company, Philadelphia, Pa., a corporation of Pennsylvania
Filed Mar. 1, 1960, Ser. No. 12,138
18 Claims. (Cl. 208—120)

This invention relates to a method for improving the product distribution resulting from a hydrocarbon catalytic cracking process in which is employed a silica-alumina cracking catalyst while substantially maintaining the stability of the catalyst. More particularly, this invention relates to a method for improving the product distribution in a hydrocarbon catalytic cracking process by contacting at least a portion of the catalyst of the process with a cation exchange resin in the hydrogen cycle in an aqueous medium. In another aspect the invention relates to a method of improving the product distribution characteristics of a silica-alumina cracking catalyst of a hydrocarbon catalytic cracking process by contacting the catalyst with a cation exchange material in the hydrogen cycle in an aqueous medium.

This application is a continuation-in-part of application Serial No. 831,308 filed August 3, 1959, entitled "Improvement of Contaminated Silica-Alumina Cracking Catalysts," now abandoned.

A number of specific methods have been devised for carrying out the hydrocarbon catalytic cracking process. Since the vast majority of these are of the continuous type the instant invention will be described in connection therewith.

In a continuous hydrocarbon catalytic cracking process, hydrocarbons together with catalyst are charged continuously to a cracking reaction zone from which the product hydrocarbons are removed continuously. Catalyst is also removed separately and continuously from the reaction zone. This catalyst has deposited on it the coke resulting from the cracking reaction. The coke is a non-volatile, high molecular weight hydrocarbonaceous material which deactivates the catalyst for further promoting the cracking reaction. The coked catalyst which is continuously removed from the reaction zone is transferred to a regeneration zone where the coke is burned from the catalyst with air or free-oxygen-containing gas thereby restoring the activity of the catalyst. The regenerated catalyst is continuously transferred back to the reaction zone for contact with additional hydrocarbons. Thus, the operation is carried out continuously with the catalyst being transferred in a cyclic manner between the reaction zone and regeneration zone.

It has been known, however, since the commercialization of the cracking process that a conventional hydrocarbon charge to such a process contains minute quantities of various heavy metal compounds such as the compounds of iron, nickel, vanadium, and other metals of the transition series of elements. These heavy metal compounds also decompose during the cracking reaction and deposit metallic contaminants on the catalyst along with the coke. When the catalyst is regenerated by burning off the coke, these metallic contaminants are not removed or burned off, but instead accumulate on the catalyst from cycle to cycle. It was recognized very early also in the history of commercial catalytic cracking that these metallic impurities on the cracking catalyst are deleterious to the process since they promote the conversion of the hydrocarbon charge to coke and normally gaseous products instead of desired normally liquid products. Since this conversion represents a loss in desirable products it is spoken of as an undesirable product distribution.

Petroleum refiners soon developed methods of operating their catalytic cracking units which minimized the effect of metal contamination of the catalyst on the product distribution. One obvious method was to select judiciously the charge stock to utilize only those charge stocks containing minimum quantities of heavy metal contaminants. This method, while it has the stated advantage, has the disadvantage that it almost automatically excludes sizeable percentages of the higher molecular weight fractions of crude oils, which except for their metal content, could satisfactorily be catalytically cracked to liquid products.

Another method was to operate the continuous catalytic cracking process so that a portion of the catalyst is more or less continuously replaced with fresh catalyst at a rate sufficient to reduce the metal contamination concentration on the catalyst. The disadvantage of this method is that it is costly and, in addition, it involves difficulties in the operation of the process in that the addition of fresh catalyst sufficient to obtain the low level of metal contamination will, at the same time, increase the overall activity level of the catalyst to the point where the production of normally gaseous hydrocarbons and coke is materially increased while the production of normally liquid hydrocarbons is materially decreased. In practice it is impossible to employ the first method exclusively. It is, however, used to the extent practicable in combination with the second method in a manner such that the economic advantage of cracking the contaminated feed will be balanced by the increased cost of fresh catalyst additions.

Metal contamination in the manufacture of fresh catalyst has also long been recognized as a problem. It should, however, be pointed out that it is not this type of contamination with which the present invention is concerned.

In the manufacture of fresh catalyst, metal contamination may be due to impurities, for example iron, known to exist in the form of metal compounds in admixture with the raw materials used in the manufacture of the catalyst. Likewise, it may be due to metal impurities introduced inherently as a function of the method of manufacture of the catalyst. A primary example of the latter impurity is sodium.

In commercial practice those impurities in admixture with the raw materials are, for the most part, controlled by the use of highly purified raw materials while those impurities which are primarily introduced inherently as a function of the method of manufacture are for the most part removed by thoroughly washing the freshly precipitated gel with water and with aqueous ammonium nitrate solutions.

Other methods proposed for the removal of sodium involve the treatment of the freshly precipitated gel with ion exchange materials such as the zeolites and with certain cation exchange resins. These latter methods have never been commercially employed. They are, however, mentioned because of what may appear to be a similarity between them and the method herein disclosed which method is applicable solely to the treatment of silica-alumina catalyst throughout the period of its use in a catalytic cracking operation, and which in fact is entirely unrelated to the treatment of fresh catalyst with respect to the manner, purpose and effect of treatment.

Recent work has shown that minor quantities of metallic contaminants on a fresh cracking catalyst do not seriously affect the product distribution of such a catalyst. This work is set forth in the article entitled "Fluid Cracking Catalyst Contamination, Fundamental Aspects of Metal Contamination," by J. E. Connor, Jr., J. J. Rothrock, E.R. Birkhimer, and L. N. Leum in Industrial and Engineering Chemistry, volume 49, page 276, et seq. (1957). In particular, FIGURE 5 of the article shows that the contamination of a fresh catalyst has little effect on the product distribution as measured by the carbon producing factor defined in the article. This paper also makes the fundamental observation that metal contaminants deposited on a cracking catalyst which has been deactivated to a level corresponding to the activity level of a catalyst found in a commercial catalytic cracking unit drastically affect the product distribution which is obtained from such a contaminated catalyst, again as shown by the carbon producing factor in FIGURE 5 of the article.

In addition, the authors point out that metal contaminants on a fresh catalyst will quickly become buried within the catalyst structure due to the collapse of the pore structure of the catalyst which will occur in a commercial unit as a result of contact of the catalyst with steam and high temperature. The metal contaminants when buried, of course, are ineffective for promoting any reactions whatsoever and therefore will not affect product distribution. Thus, the impurities introduced into the catalyst during the manufacturing process or deposited on the fresh catalyst become relatively unimportant.

The problem of improving the product distribution in a catalytic cracking process, therefore, involves eliminating the effects of the metal contaminants which are deposited on the low activity, used silica-alumina cracking catalyst. This improvement must be accomplished without seriously increasing the susceptibility of the catalyst to deactivation by steam or high temperatures or combinations thereof. In the reaction-regeneration cycle the catalyst is contacted with steam immediately prior to regeneration for the purpose of removing hydrocarbons adsorbed on the catalyst from the reaction zone. In addition, the catalyst contacts steam in the regeneration zone where steam is formed by the combustion of hydrogen contained in the coke on the catalyst and from the vaporization of water used to cool the catalyst. Thus, the catalyst in a catalytic cracking process will alway contact steam at high temperatures. Methods which have been proposed heretofore for removing metal contamination from used catalysts, for example, acid treatment, have so increased the susceptibility of the catalyst to deactivation to steam at elevated temperatures that, when the catalyst was returned to the cracking process for reuse it quickly became deactivated and had to be replaced with fresh catalyst.

It is an object of this invention to provide a method for improving the product distribution resulting from a hydrocarbon catalytic cracking process in which is employed a silica-alumina cracking catalyst while substantially maintaining the stability of the catalyst.

It is another object of this invention to provide a method for improving the product distribution resulting from a hydrocarbon catalytic cracking process by separating at least a portion of the total silica-alumina catalyst from the process and contacting the separated catalyst with a cation exchange material in the hydrogen cycle in an aqueous medium.

It is another object of this invention to provide a method for improving product distribution resulting from a hydrocarbon catalytic cracking process by removing the coke forming and gas forming metal contaminants from the silica-alumina catalyst of the process while substantially maintaining the stability of the catalyst.

It is another object of this invention to provide a method for improving the product distribution characteristics of a silica-alumina cracking catalyst by contacting the silica-alumina catalyst of a hydrocarbon catalytic cracking process with a cation exchange material in the hydrogen cycle in an aqueous medium.

It is another object of this invention to provide a method for improving the product distribution characteristics of a silica-alumina cracking catalyst by removing the coke forming and gas forming metal contaminants from the silica-alumina catalyst of a hydrocarbon catalytic cracking process while substantially maintaining the stability of the catalyst.

Other objects of this invention will be apparent from the detailed description and the claims that follow.

In accordance with the method of this invention the product distribution resulting from a hydrocarbon catalytic cracking process in which is employed a silica-alumina cracking catalyst is improved by separating at least a portion of the total catalyst from the process, contacting the separated catalyst with a cation exchange resin in the hydrogen cycle in an aqueous medium under certain specific conditions to be described hereinafter such that the coke forming and gas forming metal contaminants are removed from the catalyst while the stability of the catalyst is substantially maintained, thereafter separating the contacted catalyst from the resin and returning the contacted catalyst to the hydrocarbon cracking process.

The silica-alumina cracking catalysts which may be treated by the method of this invention include the wholly synthetic silica-alumina catalysts, the semi-synthetic silica-alumina catalysts and the so-called natural catalysts. The wholly synthetic silica-alumina catalysts include those made by the well-known commercial methods such as coprecipitation or impregnation methods. Such catalysts contain from 7 percent by weight to 30 percent by weigth of alumina with the remainder being silica. The semi-synthetic silica-alumina cracking catalysts may be produced by the addition of silica and alumina to a natural clay or an acid treated clay to give alumina contents in the range of about 30 percent to 35 percent by weight of the finished catalyst. In the so-called natural catalysts, the natural clay may be acid treated only or alumina may be added to the acid treated clay to give alumina contents ranging from about 15 percent to 50 percent by weight of the finished catalyst.

In the practice of this invention, for ease in handling the catalyst preferably should not constitute more than about 40 weight percent of the catalyst-water mixture and not less than about 10 percent by weight of such mixture. If the mixture contains more than about 40 weight percent silica-alumina, when the required quantity of cation exchange resin is added thereto, the solids content of the mixture becomes too great to be handled readily, consequently, such mixtures are not desired. If the silica-alumina is present in concentrations of less than about 10 weight percent, the total volume which must be treated becomes exceedingly large and therefore such dilute mixtures are not preferred.

The aqueuos mixture of the silica-alumina cracking catalyst of the hydrocarbon catalytic cracking process is contacted with solid particles of a cation exchange resin in the hydrogen cycle. It is desirable that the particles of the cation exchange resin be of a different size from the silica-alumina particles in order that after the contacting period the particles of cation exchange resin may be separated from the silica-alumina catalyst particles by simple conventional methods such as by screening or by elutriation. For example, it has been found that the particles of a silica-alumina catalyst which has been used in a fluid catalytic cracking unit may be separated readily from the particles of the cation exchange resin since the particle size of the catalyst is such that it will pass through a 100 mesh U.S. Standard Sieve and the particle size of the cation exchange resin as produced commercially is in the range of 10 to 50 mesh U.S. Standard Sieve.

The catalyst and resin may be contacted either in a continuous manner or batchwise. In either method it is important that the mixture be agitated thoroughly to provide intimate contacting between the resin and catalyst during the entire time of contact. Agitation with mechanical agitators may be employed or alternatively agitation with a gaseous medium such as steam or air may be utilized. When the contacting is carried out at elevated temperatures, heating may be accomplished by the use of jacketed vessels which may supply heat to the mixture from an external source or alternatively the heat may be supplied to the mixtures by the steam agitation.

After the contacting step the catalyst may be separated from the resin by any convenient conventional method such as by screening or by elutriation. In general, it has been found preferable to separate the catalyst from the resin by elutriation methods employing an ascending aqueous stream since in such methods attrition of the friable resin particles is minimized.

The quantity of cation exchange resin to be employed in contacting the silica-alumina in the earlier work of the instant invention was thought to be a function of the quantity of metallic impurities associated with the catalyst and the degree of catalyst deactivation. It has been found, however, that the quantity of cation exchange resin required for improving the product distribution characteristics of the silica-alumina catalyst of a hydrocarbon cracking process is much greater than that amount calculated solely on the basis of the quantity of metal contaminants to be removed in order to improve the product distribution characteristics of the used catalyst. The reason that such excessive "capacity" of ion exchange resin is required is not known. However, it is believed that it is necessary to have a large quantity of the resin present such that the probability that the metal contaminants will be transferred to a resin particle is much greater than the probability that the metal contaminants will be transferred merely to another catalyst particle.

In general, it has been found that the ratio of catalyst to cation exchange resin should range between 0.25 gram to 1.0 gram of catalyst per milliliter of wet cation exchange resin which is approximately 0.5 gram to 2.0 grams of catalyst per gram of dry cation exchange resin.

One mode of carrying out the process of the instant invention is to remove all of the catalyst from the catalytic cracking unit and contact the total used catalyst inventory of the unit with the cation exchange resin to remove the coke forming and gas forming metal contaminants from the catalyst. After separating the catalyst from the resin the catalyst is replaced in the unit. This mode of operation requires that the cracking unit be shut down, hence it is most applicable when the unit is being shut down for mechanical overhauling. Since this mode can be carried out only on a periodic basis with long intervals between treatments, it is not preferred.

The preferred mode of carrying out the process of the instant invention is to separate a portion of the catalyst currently in use in the cracking process from the cracking unit without interrupting the operation of the unit. The separated portion of the catalyst is contacted with the cation exchange resin to remove the coke forming and gas forming metal contaminants from the catalyst and, after separating the contacted catalyst from the resin, the contacted catalyst is returned to the unit. This operation may be carried out either on a continuous basis or on a periodic basis. For example, if it is carried out on a periodic basis a portion of the total catalyst may be removed once a shift, once a day or even less frequently according to the requirements of the refiner for improving the product distribution of the cracking process. If the process is carried out by continuous removal of the catalyst, a small portion of the catalyst in the unit is continuously withdrawn, treated by the method of this invention and continuously returned to the unit. In either case the portion of catalyst being treated may be expressed in weight percent of total inventory per unit of time, normally per day. In the cracking of gas oil containing normal quantities of the usual metal contaminants this percent of inventory of used catalyst in the cracking unit treated per day generally ranges from 5 to 15 percent. If the gas oil is unusually clean it may not be necessary to treat as much as 5 percent, whereas if it is highly contaminated, it may be necessary to treat a larger percentage of the inventory per day.

In the case of materials of higher molecular weight than gas oils, such as residual materials, in which metal contamination is extremely high, it is generally required that amounts ranging from 15 percent to 40 percent of the inventory per day be treated.

In cases where the amounts being treated per day are high, it may be necessary to increase the total inventory of used catalyst so that the removal of this high amount of catalyst for treatment will not interfere with the operation of the cracking process.

By treating a portion of the catalyst inventory in a unit on a regular basis the contamination of the catalyst is reduced to a low level and thus the desired improvement in product distribution of the cracking process is obtained.

The cation exchange resins suitable for the method of this invention are the commercially available strong acid synthetic type cation exchange resins such as Amberlite IR-120 or Permutit-Q which are produced by the sulfonation of the copolymer prepared from a mixture of styrene and divinylbenzene. Amberlite IR-120 and Permutit-Q are well-known to the art of ion exchange and their preparation is described in detail in both the patented art and in the technical literature, in particular, the detailed method of their preparation is set forth starting with the first full paragraph on page 84 of the book by Robert Kunin, entitled "Ion Exchange Resins," Second Edition, John Wiley and Sons, Inc., New York (1958).

The cation exchange resins as manufactured and shipped are wet with water and are used in this condition. When at least a portion of the ion exchange capacity of the cation exchange resin has become saturated by the cations removed from the catalyst, the exchanger is regenerated by acid treatment in accordance with conventional methods recommended by the manufacturer. Generally the resin after each contact with the catalyst is regenerated even though its exchange capacity may be only partially saturated in order to insure that in the next cycle there is present the above-mentioned required excess of the resin in the hydrogen cycle. However, when the quantities of contaminants on the catalyst are low, it may be found unnecessary to regenerate all of the resin after each contact with the catalyst.

Since the commercialization of the catalytic cracking process a number of laboratory tests have been developed which have been proved to measure accurately the properties of the catalyst when used in these commercial units. Although a number of modifications of these tests are used, all are essentially equivalent in testing the various properties of these cracking catalysts.

A number of methods have been described in the literature for measuring the activity of the silica-alumina cracking catalysts. The activity of the catalysts treated by the process of this invention were measured by the distillate-plus-loss ($D+L$) scale according to the method of Birkhimer et al., "A Bench Scale Test Method for Evaluating Cracking Catalysts," Proceedings of the American Petroleum Institute, Division of Refining, volume 27 (III), page 90, (1947). According to the Birkhimer et al. $D+L$ activity measurement method, it would be possible to have a theoretical maximum $D+L$ of 100; however, in general, the maximum $D+L$ for a fresh synthetic silica-alumina cracking catalyst will range between 90 and 95 while the $D+L$ for a commercially used synthetic silica-alumina cracking catalyst will range between 30 and 50. The other activity measuring methods employ $D+L$ scales having much lower values for a fresh silica-alumina cracking catalyst, usually of the order of 45 to 65 depending upon the particular test. These methods will show a correspondingly lower $D+L$ measure for a commercially used catalyst as compared with a Birkhimer et al. $D+L$ scale. Accordingly, when there is mentioned a $D+L$ measure herein, it is the Birkhimer et al. method that is being employed.

The carbon producing tendencies of the catalyst treated in accordance with the process of this invention were measured according to the method set forth in the aforementioned Birkhimer et al. article and also described in the article by J. J. Rothrock et al. entitled "Fluid Cracking Catalyst Contamination," Industrial and Engineering Chemistry, volume 49, page 272 (1957). According to this method the carbon producing tendencies of the catalyst is expressed as the carbon producing factor (CPF). Carbon producing factor is defined as the ratio of carbon produced from a standard feed stock with a catalyst under test compared to the carbon produced from the same material from a standard catalyst at the same conversion level. Hence a carbon producing factor of three means that the metal contaminated catalyst in question produces three times as much carbon as a standard uncontaminated fresh catalyst at the same conversion. Thus, in measuring carbon producing factors each catalyst was tested by employing a standard charge stock under standard conditions in accordance with the Birkhimer et al. method and compared with a standard catalyst tested with an identical feed stock and under identical conditions. Consequently the carbon producing factors of the catalysts tested are comparable one to the other and are comparable to the standard catalyst which is a commercial, fresh, uncontaminated synthetic silica-alumina cracking catalyst containing approximately 13 percent by weight of alumina and 87 percent by weight of silica and which has a carbon producing factor of one at all conversion levels, by definition.

In addition to the activity and coke producing properties of a commercial cracking catalyst, the stability of this catalyst to deactivation under conditions encountered in the commercial unit must also be evaluated. Specifically these conditions are steam and high temperatures. The catalyst encounters steam in the stripping section and in the regeneration zone as has been described. The catalyst also encounters elevated temperatures in the order of 1150° F. or higher in the regeneration zone. These two factors both have a deactivating effect on the catalyst and, accordingly, accelerated laboratory tests have been devised to simulate the deactivating effect of steam and high temperatures on the catalyst.

In order to measure the stability of the catalysts toward steaming the $D+L$ of the catalyst was determined prior to steaming and thereafter the catalyst was contacted with steam at a pressure of 30 pounds per square inch gauge for five hours at a temperature of 1050° F. After steaming the $D+L$ of the catalyst was again measured and the loss in activity $(D+L)$ noted. This loss gives a measure of the steam stability of the catalyst.

In order to measure the stability of the catalyst toward high temperatures the $D+L$ of the catalyst was determined and thereafter the catalyst was heated for two hours at a temperature of 1700° F. After the heat treatment the $D+L$ of the catalyst was again measured and the change in activity $(D+L)$ noted. This change gives a measure of the high temperature stability of the catalyst.

The temperature of contacting the catalyst with the cation exchange resin may range from about 75° F. to the temperature at which the cation exchange resin disintegrates. The disintegration temperatures of cation exchange resins are furnished by the manufacturer or are otherwise known. Many of these resins will withstand temperatures of the range of 250° F. to 260° F. and certain heat resistance cation exchanges will withstand somewhat higher temperatures. It is possible to operate at these higher temperatures, of course, by employing superatmospheric pressures to keep the water in the liquid phase.

It is necessary to use much longer contact times when employing temperatures of about 75° F. than when employed moderately elevated temperatures such as 120° F. and higher. Thus, at 75° F. contact times of 24 hours are required to improve the product distribution of the catalyst to an extent comparable with contact times of from only 2 to 3 hours at the higher temperatures. In general, contact times of at least one hour and preferably two hours are required for temperatures of 120° F. to the disintegration temperature of the resin. The preferred contact temperatures range from 120° F. to 250° F. and the preferred contact times from two to eight hours. Longer times at the higher temperatures are not harmful, but do not give any appreciable improvement in the product distribution properties of the catalyst. It will be recognized, of course, that if lightly contaminated feed stocks are employed or if the catalyst has been decontaminated by a thorough treatment according to the method of this invention, somewhat shorter treating times and milder conditions may be employed in order to maintain the quantity of contaminants on the catalyst at a level which will produce the desired product distribution for the catalyst.

Another important contacting condition of this process is the pH of the aqueous medium during contacting the catalyst with the cation exchange resin. The upper pH limit is determined by the quantity of coke forming and gas forming metal contaminants which can be removed. If the pH is too high the amount of such contaminants removed is so low that little or no improvement in the product distribution of the catalyst will be obtained. Consequently, it is necessary to have a pH of below 4.5 and preferably below 4.2 in order to remove sufficient coke forming and gas forming metal contaminants to improve the product distribution of the catalyst.

At a pH ranging from about 2.7 to 4.2 excellent decontamination of the catalyst is obtained without deleteriously affecting the steam stability and high temperature stability of the catalyst. This would be the normal and preferred pH operating range. It will be seen from the discussion that follows, however, that a pH as low as 2.0 may be employed advantageously, even though in the range of 2.0 pH to 2.7 pH the steam stability of the catalyst is reduced slightly, i.e. the stability of the catalyst is substantially, although not completely, maintained.

It has been pointed out that heretofore the refiner maintained a certain contamination level in the catalytic cracking process by adding fresh uncontaminated catalyst to the process. The amount of fresh catalyst which could be added, however, was limited by the fact that eventually the overall activity of the catalyst in the unit was raised to a level at which the ratio of normally liquid products to normally gaseous products and coke was undesirable from an economic standpoint. Since the present invention provides a method whereby the contamination level in a catalytic cracking process may be reduced to a low level and the product distribution correspondingly improved thereby, the refiner can reduce the rate of addition of fresh catalyst to a point where only that amount necessary to make up physical losses from the unit is being added. In many cases this amount of fresh catalyst added may be more than enough to maintain the desired activity level of the total catalyst in the cracking process. The difference between the amount of fresh catalyst added to the process before instituting the treatment of this invention and the amount of fresh catalyst added to maintain the physical inventory of catalyst in the process after the catalyst has been treated by the process of this invention represents the quantity of catalyst saved by the removal of contaminants according to the process of this invention. Slight reductions in the steam stability of the catalyst occasioned by treatment of the catalyst at pH's below 2.7 may reduce somewhat the amount of catalyst saved since the overall activity of the catalyst will be lowered and, accordingly, it will be necessary for the refiner to add some additional catalyst to raise the activity of the total catalyst inventory. When the contacting is carried out in an aqueous medium having a pH of below about 2.0 the steam stability of the catalyst will no longer be substantially maintained. Under these conditions the amount of fresh catalyst required to be added to maintain activity becomes as great as that required to maintain a low contamination level without using the process of this invention. Thus, the advantage of the contaminant removal according to the process of this invention will be lost entirely.

The examples that follow are provided for the purpose of illustrating specific embodiments of the invention and demonstrating certain critical features of the invention. In addition, these examples are provided to demonstrate the utility of the invention in improving the product distribution characteristics of a silica-alumina catalyst used in a catalytic cracking process when metal contaminants are removed from the cracking catalyst in accordance with the process of this invention.

EXAMPLE I

A large sample of a typical commercial fluid catalytic cracking plant used silica-alumina cracking catalyst (approximately 13 percent by weight alumina and approximately 87 percent by weight silica) was obtained. This catalyst had been used in a commercial cracking unit under fixed operating conditions to crack a typical commercial gas oil containing normal quantities of metallic compounds with fixed rates of addition of fresh catalyst make-up so that the catalyst had reached an approximately constant activity and contaminant level.

This used catalyst had a $D+L$ of 41.7 as determined by the Birkhimer et al. activity method. It had a carbon producing factor (CPF) of 2.19 and contained 0.19±0.02 percent by weight of iron and 0.31 percent by weight sodium. This silica-alumina catalyst in the fresh, uncontaminated state has a $D+L$ of 90 to 95, usually 92-93, and contains from 0.03 to 0.04 weight percent iron and about 0.01 weight percent sodium.

A portion of this used catalyst was steamed for five hours at 1050° F. under a pressure of 30 pounds per square inch gauge. The $D+L$ activity after steaming was 33.8.

Other portions of the used catalyst were contacted with a cation exchange resin according to the following experimental technique:

A 700 ml. sample of Permutit-Q cation exchange resin in the hydrogen cycle was mixed with 635 ml. of water to form a slurry which was heated to the desired contacting temperature. Sufficient sulfuric acid was added to the slurry to provide the desired pH during the contacting period. When contacting temperatures above 180° F. were to be employed the acid was added to the resin slurry prior to heating the slurry to the desired temperature. A 350-gram portion of the dry, used catalyst described above was added to the cation exchange resin slurry with constant agitation to form a slurry of catalyst and resin. After the catalyst was contacted with the cation exchange resin for the desired time at the desired temperature, it was separated from the resin by screening. The resin was washed with additional water to remove adhering catalyst and the catalyst was separated from the water and dried. The $D+L$, CPF, weight percent iron and weight percent sodium were determined for the dried, treated catalyst. A portion of the dried, treated catalyst was subjected to steaming for five hours at 1050° F. under 30 p.s.i.g. pressure and thereafter the $D+L$ of the treated, steamed catalyst was measured.

The contacting conditions for a number of experiments employing the described technique and the results obtained under such conditions are set forth in Table I.

Table I

| Experiment No. | Conditions | | | After Ion Exchange | | | | After Ion Exchange and Steaming, $D+L$ |
|---|---|---|---|---|---|---|---|---|
| | pH | Temp., °F. | Time, hours | $D+L$ | CPF | Wt. Percent Fe | Wt. Percent Na | |
| 1 | 1.58 | 180 | 1 | 54.0 | 1.18 | 0.14 | 0.15 | 22.4 |
| 2 | 2.10 | 180 | 1 | 52.7 | 1.39 | 0.13 | 0.19 | 28.7 |
| 3 | 2.40 | 180 | 1 | 45.5 | 1.53 | 0.13 | 0.17 | 32.5 |
| 4 | 2.40 | 212 | 4 | 52.8 | 1.22 | 0.11 | 0.15 | 25.9 |
| 5 | 3.12 | 212 | 4 | 54.4 | 1.32 | (1) | 0.09 | 34.1 |
| 6 | 3.40 | 212 | 4 | 51.1 | 1.19 | 0.18 | 0.12 | 38.6 |
| 7 | 5.10 | 212 | 4 | 48.9 | 1.98 | 0.18 | 0.23 | 33.7 |
| 8 | 2.45 | 180 | 4 | 58.3 | 0.94 | 0.13 | 0.16 | 27.8 |
| 9 | 4.15 | 212 | 16 | 49.9 | 1.10 | 0.12 | 0.15 | 39.8 |

[1] Not determined.

These data show in general that treatment with a cation exchange resin improves the product distribution characteristics of the catalyst as measured by the carbon producing tendencies (CPF) of the catalyst. They show also that although there is some small removal of iron from the catalyst, by no means is there complete removal, thus substantiating the findings of Connor, Rothrock, Birkhimer and Leum in the article previously mentioned that only a small portion of the total quantity of heavy metal on the catalyst deleteriously affects the product distribution of the catalyst, the remaining portion of the metal being buried in the pore structure of the catalyst or in otherwise inactive form on the surface of the catalyst. The data in the table also show that there was some removal of sodium from the catalyst which accounts in part at least for the increase in activity of the catalyst as measured by the $D+L$ after ion exchange. These data are also in accordance with the findings in the aforementioned paper of Connor et al., that sodium is very important with respect to the activity of the catalyst but as was shown in this paper and in the references cited therein, sodium has essentially no effects on the carbon producing tendencies of the catalyst.

In the accompanying drawing there is a plot of the $D+L$ of the catalyst after steaming versus the pH employed during the treat with the cation exchange resin, i.e. the solid curve designated curve "A." This curve was obtained from the data in Table I. Dotted line "B" is placed on this plot to locate the $D+L$ level, 33.8, obtained when the used catalyst is steamed without being contacted with the cation exchange resin. Dashed line "C" represents the $D+L$ level of a catalyst after steaming, which catalyst has been contacted with a cation exchange resin in an aqueous medium having a pH of 2.0 according to the method of this invention.

All treated catalysts having a $D+L$ after steaming greater than the 33.8 value of the untreated catalyst, i.e. those having $D+L$ values above the dotted line in the plot, have, of course, satisfactory steam stability. The data and plot of the drawing demonstrates that if the contacting is carried out at a pH below about 2.7 (approximately the point at which curve "A" crosses dotted line "B") the steam stability of the catalyst is represented by its activity after steaming is slightly reduced, although the CPF is satisfactory. It will be noted from the curve "C" that if the treatment is carried out as low as a 2.0 pH the activity after steaming has been reduced only to slightly less than 30 $D+L$. As has been discussed herein this is an acceptable level since the refiner may either add additional catalyst over that required when operating in the preferred pH range or change the operating conditions in the unit or make both of these changes to compensate for the loss in steam stability of the catalyst as represented by the decrease in activity after steaming.

EXAMPLE II

A number of additional experiments were carried out on the same used catalyst employed in Example I using the described technique of Example I and Permutit–Q as the cation exchange resin. In these experiments sulfuric acid was used to control the pH and various temperatures and times of contacting were employed. The contacting conditions and the results obtained for each experiment are set forth in Table II.

Table II

| Experiment No. | Conditions | | | After ion exchange | |
|---|---|---|---|---|---|
| | Temp., °F. | Time, Hrs. | pH | $D+L$ | CPF |
| 1 | 75 | 4 | 3.1 | 48.2 | 1.5 |
| 2 | 120 | 4 | 2.9 | 57.3 | 0.84 |
| 3 | 150 | 4 | 2.8 | 54.8 | 0.96 |
| 4 | 180 | 4 | 2.9 | 60.6 | 0.81 |
| 5 | 212 | 4 | 3.0 | 57.4 | 1.00 |
| 6 | 250 | 4 | 3.3 | 54.3 | 1.36 |
| 7 | 180 | 1 | 3.1 | 55.1 | 1.38 |
| 8 | 180 | 2 | 2.9 | 57.5 | 1.00 |
| 9 | 180 | 7 | 3.0 | 58.4 | 0.93 |
| 10 | 180 | 24 | 3.1 | 57.5 | 1.00 |
| 11 | 75 | 1 | 3.1 | 41.6 | 2.15 |
| 12 | 75 | 24 | 2.8 | 54.3 | 1.33 |

These data show that the product distribution is improved when the contacting is carried out at temperatures ranging from 75° F. to 250° F. (Experiments 1 to 6, inclusive) and that a contact time of at least one hour is required and preferably a contact time of two hours should be used (Experiments 7 and 8). The data also show that contact times from 2 to 8 hours are sufficient in most cases although with temperatures of the order of 75° F. contact times of as long as 24 hours are required. These data also show, however, that very long contact times of the order of 24 hours with temperatures in the optimum range (Experiment 10) do not give any improvement in product distribution of the catalyst.

EXAMPLE III

Additional experiments were carried out on the same used catalyst employed in Examples I and II using the described technique of Example I and Permutit–Q as the cation exchange resin. In these experiments various acids were used to control the pH of the aqueous medium. The contacting conditions and the results obtained are set forth in Table III Table III

| Experiment No. | Conditions | | | | After Ion Exchange | |
|---|---|---|---|---|---|---|
| | pH | Temp., °F. | Time, hrs. | Acid for pH Control | $D+L$ | CPF |
| 1 | 3.60 | 212 | 4 | Oxalic | 54.3 | 1.16 |
| 2 | 3.30 | 212 | 4 | Citric | 53.7 | 1.25 |
| 3 | 3.00 | 212 | 4 | Tartaric | 51.8 | 1.29 |
| 4 | 3.30 | 212 | 4 | Hydrochloric | 52.3 | 1.32 |
| 5 | 3.50 | 180 | 3 | ----do---- | 52.9 | 1.24 |

These data show that various acids may be utilized to control the pH of the aqueous medium during the contacting of the catalyst with the cation exchange resin and that the catalysts so treated have improved product distribution characteristics as shown by their carbon producing factors.

EXAMPLE IV

A portion of the same used silica-alumina catalyst employed in the previous examples was contacted with a reduced crude in a small scale fixed fluidized bed catalytic cracking unit in order to deposit large quantities of metal contaminants on the catalyst and also decrease its activity to a low level while raising its carbon producing factor to a very high level. Fresh uncontaminated catalyst was added each day and the run was continued until equilibrium conditions were obtained. When this catalyst was removed from the unit it had a $D+L$ of 35.0 and a CPF of 14.5. The catalyst contained 0.26 weight percent iron, 0.25 weight percent sodium, 0.09 weight percent nickel, and 0.22 weight percent vanadium. A sample of this contaminated catalyst was contacted with the Permutit–Q exchanger according to the technique described in Example I at a temperature of 212° F. for four hours with the pH controlled to 2.9 by sulfuric acid. After contacting, the activity, CPF, and metal content of the catalyst were determined. The activity had been raised to a $D+L$ of 48.5, the CPF lowered to 3.2 and the metal content lowered to 0.18 weight percent iron, 0.08 weight percent sodium, 0.057 weight percent nickel and 0.056 weight percent vanadium. This example demonstrates that the method of the instant invention is applicable to highly contaminated cracking catalysts and can be used to improve their product distribution characteristics and remove metal contamination from such catalysts.

EXAMPLE V

Another portion of the same used silica-alumina cracking catalyst employed in the previous examples was contacted with a reduced crude in the small scale fixed fluidized bed catalytic cracking unit employed in Example IV. In this experiment conditions and addition of fresh catalyst were controlled so that the catalyst did not become as contaminated or deactivated as the catalyst of Example IV. When removed from the unit it had a $D+L$ of 56.0 and CPF of 2.8. The iron content was 0.13 weight percent and the nickel content 0.05 weight percent. Other metals were not determined. A sample of this catalyst was contacted with Permutit–Q cation exchanger according to the technique described in Example I at a temperature of 212° F. for four hours with the pH controlled to 2.9 with sulfuric acid. After contacting with the cation exchanger the catalyst had a $D+L$ of 66.5 and CPF of 1.32. The iron content had been lowered to 0.047 weight percent and the nickel content to 0.03 weight percent. This example also shows the utility of the present method for improving the product distribution characteristics of a contaminated catalyst.

EXAMPLE VI

Two comparable experiments were carried out to demonstrate that acidulated water alone when contacted with a contaminated catalyst will not improve the product distribution characteristics of the catalyst in accordance with the objects of this invention, but that it is necessary to employ a cation exchange resin in order to obtain the desired improvements to the catalytic cracking process and catalyst.

A portion of the same used catalyst of Examples I and II was elutriated to remove fines from the catalyst, the fines amounting to from 30 to 35 weight percent of the original used catalyst. This elutriated catalyst which had a $D+L$ of 41.0, a CPF of 2.3 and an iron content of 0.18 weight percent was divided into two portions. One portion was contacted with a Permutit–Q cation exchanger according to the technique described in Example I at a temperature of 212° F. for two hours with the pH controlled to 2.95 with sulfuric acid. This catalyst after separation from the resin and drying had a $D+L$ of 55.5, a CPF of 1.0 and an iron content of 0.13.

The second portion of the elutriated catalyst was contacted with acidulated water having a pH of 2.95 controlled by sulfuric acid addition. The temperature of contact was maintained at 212° F. and the acidulated water pumped continuously over the catalyst at the rate of 250 ml. per minute. The water which had contacted the catalyst was discarded and replaced with fresh hot acidulated water added at the rate of 250 ml. per minute. The aded water contained sufficient sulfuric acid to maintain the pH at 2.95. This process was continued for two hours so that the catalyst had come into contact with a quantity of acidulated water amounting to 30,000 ml. After the catalyst was separated and dried it had a $D+L$ of 51.0, a CPF of 1.9 and an iron content of 0.12.

It will be noted that the use of acidulated water within the critical pH range does not appreciably improve the product distribution characteristics of a used silica-alumina cracking catalyst. Accordingly, therefore, it is necessary that ion exchange resin be present in order to obtain the desired improvement in product distribution of the catalytic cracking process and catalyst.

EXAMPLE VII

A sample was obtained of a commercial fluid catalytic cracking plant used silica-alumina catalyst similar to that of Example 1 except that it contained approximately 25 weight percent alumina and 75 weight percent silica. This catalyst had a $D+L$ of 45.0, a CPF of 2.48 and an iron content of 0.46 weight percent. It was contacted with the Permutit-Q cation exchanger according to the technique described in Example I at 212° F. for four hours with the pH controlled to 3.10 with sulfuric acid. After separating and drying the catalyst had a $D+L$ of 59.0, a CPF of 1.76 and an iron content of 0.31.

Another sample of a used silica-alumina catalyst having the same composition (25 weight percent alumina, 75 weight percent silica) was obtained from another comercial fluid catalytic cracking unit. This catalyst had a $D+L$ of 59.0, a CPF of 1.51 and an iron content of 0.22. After contacting with the Permutit-Q cation exchanger according to the technique described in Example I at 210° F. for four hours with the pH controlled to 3.15 with sulfuric acid and separating and drying, the catalyst had a $D+L$ of 62.0, a CPF of 1.26, and an iron content of 0.16. These experiments show that silica-alumina cracking catalysts of various compositions may be improved by the method of the instant invention.

EXAMPLE VIII

In order to demonstrate that when the process of this invention is utilized for the removal of ionic impurities from silica-alumina cracking catalysts during the process of their manufacture, the resulting catalysts have no practical utility for the cracking of hydrocarbons, the following experiments were carried out.

A sample of a co-precipitated silica-alumina hydrogel was removed from a commercial silica-alumina catalyst plant at the stage prior to spray drying. This sample contained 12.4 weight percent alumina and 6.2 weight percent sodium, each based on the dry weight of solids present. A 350-gram portion of this hydrogel, on the dry solids basis, was contacted with 1400 ml. of wet, drained Permutit-Q cation exchange resin at a pH of 4.2 and at 75° F. for 24 hours. The resin was removed from the catalyst slurry by screening. Since sodium was found in the slurry by the standard magnesium uranyl acetate test, the slurry was recontacted with 700 ml. of fresh Permutit-Q cation exchange resin at a pH of 4.2 and at room temperature for 24 hours. Since sodium was still found in the slurry two additional treats with 700 ml. of Permutit-Q resin were carried out at a pH of 4.2 at 75° F. each for 24 hours. At the end of the last treat there was no sodium present in the slurry according to the standard test. This material was dried in an oven at 220° F. and calcined in a conventional manner at 1000° F. The finished catalyst had a $D+L$ of 17.0 by the Birkhimer et al. method indicating it had essentially no cracking activity.

Another sample of the coprecipitated silica-alumina hydrogel utilized above was dried at a temperature of 900° F. until approximately a constant weight product was obtained.

One 350-gram portion of this dried material was contacted with 1400 ml. of wet, drained Permutit-Q cation exchange resin at a pH of 3.8 and at 75° F. for 66 hours. The resin was removed from the catalyst slurry by screening. Since sodium was found in the slurry by the standard magnesium uranyl acetate test, the slurry was recontacted with 700 ml. of fresh Permutit-Q cation exchange resin for 24 hours. This material when analyzed had a sodium content of 0.4 weight percent. This material was dried in an oven at 220° F. and calcined in a conventional manner at 1000° F. The finished catalyst had a $D+L$ of 60 as compared with the $D+L$ of a freshly prepared commercial catalyst which ranges from 90 to 95 and the $D+L$ of a commercially used silica-alumina cracking catalyst which ranges up to 50. A second 350-gram portion of the catalyst was dried at 900° F. and thereafter was contacted with 1400 ml. of wet drained Permutit-Q cation exchange resin at a pH of 4.2 and at a temperature of 212° F. for 4 hours. The resin was removed from the catalyst slurry by screening and the sodium content of the treated catalyst was found to be 0.43 weight percent. The catalyst was dried at 220° F. and calcined in a conventional manner at 1000° F. The finished catalyst had a $D+L$ of 50.7 by the Birkhimer et al. method indicating that it had essentially the cracking activity of a commercially used silica-alumina catalyst. The steam stability of the catalysts prepared by the above described treatment was found to be exceedingly poor. These data demonstrate that the method of this invention is applicable only to the improvement of the product distribution characteristics of catalysts which have been used in the catalytic cracking of hydrocarbons and thus have been subjected to high temperatures for very extended periods of time.

EXAMPLE IX

There was obtained a sample of used natural silica-alumina cracking catalyst having an activity of 52.5 $D+L$ and a CPF of 1.65. This natural catalyst was a commercial material produced by severe acid treating a natural clay, adding sufficient alumina thereto to give a finished catalyst containing about 48 weight percent alumina and having a $D+L$ of about 70. A 100-gram sample of this equilibrium silica-alumina catalyst was contacted with a water slurry of 200 ml. of Permutit-Q cation exchange resin at a pH of 3.17 and at a temperature of 212° F. for four hours. The catalyst after separation from the resin and drying had a $D+L$ of 66.0 and a CPF of 1.07.

This example demonstrates that the method of this invention may be used to improve the product distribution characteristics of various commercially used silica-alumina catalysts.

EXAMPLE X

Two comparable experiments were carried out on a semi-plant scale fluid catalytic cracking unit. In the first experiment a large portion of the same elutriated commercially used silica-alumina catalyst of Example VI was employed to crack a standard gas oil, with the addition per day of 0.31 pounds of fresh uncontaminated silica-alumina catalyst per barrel of feed passed over the catalyst. When the unit had been running long enough to reach equilibrium conditions a sample of catalyst was removed and tested. It had a $D+L$ of 52 and a CPF of 3.05.

In the second experiment another large portion of the same used catalyst of Example VI was employed to crack the same standard gas oil with the same rate of fresh catalyst make-up. In addition, there was withdrawn daily from the unit 2.0 pounds of catalyst per barrel of feed. The catalyst portion was contacted with a Permutit-Q cation exchanger according to the standard technique at a temperature of 212° F. for four hours with the pH controlled to 3.5 with sulfuric acid. After the catalyst was separated from the resin and dried it was returned to the unit. After the unit had been operated for the same length of time as in the first experiment, a sample of catalyst was removed and tested. It had a $D+L$ of 55.5 and a CPF of 1.20. These experiments show that by periodically removing and treating according to the method of this invention a portion of the catalyst in an operating unit, then returning the treated catalyst to the unit, it is possible to improve the product distribution of the catalytic cracking process.

EXAMPLE XI

A sample of a commercially used silica-alumina cracking catalyst such as employed in Example I was treated for 24 hours at 212° F. at a pH of approximately 3.0 with a Permutit–Q cation exchange resin in the hydrogen cycle to remove all metal contaminants from the catalyst. Iron naphthenate dissolved in a contaminant-free oil was contacted with a fixed fluidized bed of the decontaminated catalyst prepared as described above. This contacting was carried out until 0.2 weight percent of iron had been deposited on the catalyst. This method was employed to contaminate the catalyst artificially with a known amount of contaminant in accordance with the teachings of the aforementioned paper of Connor et al. The artificially contaminated catalyst was separated into three portions.

The first portion was contacted with Permutit–Q cation exchanger resin in the hydrogen cycle in a ratio of 0.5 gram of catalyst per milliliter of resin, at 212° F. for four hours at a pH of about 2.6. After this contacting, the catalyst was separated from the resin by screening and thereafter dried. The catalyst had a $D+L$ of 49.0 and a CPF of 0.97.

The second portion of the artificially contaminated catalyst was contacted with Permutit–Q cation exchange resin under the same conditions as the first portion except that the ratio was 1.5 grams of catalyst per milliliter of resin. The dried contacted catalyst had a $D+L$ of 40.0 and a CPF of 2.45. The third portion was treated under the same conditions as the first two portions except that the catalyst to resin ratio was 3.0 grams of catalyst per milliliter of resin. After drying the treated catalyst had a $D+L$ of 37.7 and a CPF of 3.14.

Since the exact quantity of metal contaminants present was known and since the total capacity of the ion exchange resin was known in all cases, it was clear that there was a large excess of ion exchange resin capacity over that required to remove the known amount of metal contaminants from the catalyst. From these data, therefore, it is concluded that the catalyst to resin ratio is not determined by the total ion exchange resin capacity needed to remove the metal contamination but instead a large excess of resin capacity is required in order to obtain the desired improvements in product distribution characteristics of a catalyst.

EXAMPLE XII

A sample of the elutriated catalyst from Example VI was contacted with a Permutit–Q cation exchange resin at a catalyst to resin ratio of 0.5 gram of catalyst per milliliter of resin at a temperature of 212° F. for four hours at a pH of approximately 3.1. The catalyst was separated from the resin and dried. The dried catalyst was heated for 2 hours at 1700° F. in accordance with the aforementioned high temperature stability test. At the end of the heat treatment it had a $D+L$ of 43. The untreated catalyst after heating at 1700° F. for 2 hours had a $D+L$ of 39.0. Accordingly, therefore, it will be seen that the heat stability of the catalyst was slightly improved by the method of this invention.

We claim:

1. A method for improving the product distribution resulting from a hydrocarbon catalytic cracking process in which is employed a silica-alumina cracking catalyst which catalyst has become contaminated with metals during use in said process and which contaminated catalyst in the process has been subjected to at least one regeneration cycle which comprises separating at least a portion of the total catalyst from the process intimately contacting the separated catalyst with a cation exchange resin in the hydrogen cycle in an aqueous medium thereby at least partially removing coke forming and gas forming metal contaminants from the cataylst while the stability of the catalyst is substantially maintained, separating the contacted catalyst from the resin, and returning the contacted catalyst to the hydrocarbon cracking process.

2. A method for improving the product distribution resulting from a hydrocarbon catalytic cracking process in which is employed a silica-alumina cracking catalyst which catalyst has become contaminated with metals during use in said process and which contaminated catalyst in the process has been subjected to at least one regeneration cycle which comprises separating at least a portion of the total catalyst from the process, intimately contacting the separated catalyst with a cation exchange resin in the hydrogen cycle in an aqueous medium at a pH such that the coke forming and gas forming metal contaminants are at least partially removed from the catalyst while the stability of the catalyst is substantially maintained, separating the contacted catalyst from the resin, and returning the contacted catalyst to the hydrocarbon cracking process.

3. A method for improving the product distribution resulting from a hydrocarbon catalytic cracking process in which is employed a silica-alumina cracking catalyst which catalyst has become contaminated with metals during use in said process and which contaminated catalyst in the process has been subjected to at least one regeneration cycle which comprises separating at least a portion of the total catalyst from the process, contacting the separated catalyst with a cation exchange resin in the hydrogen cycle in an aqueous medium at a pH ranging from 2.0 to 4.5 with a catalyst to resin ratio ranging from 0.25 gram to 1.0 gram per milliliter of wet cation exchange resin, separating the contacted catalyst from the resin, and returning the contacted catalyst to the hydrocarbon cracking process.

4. A method for improving the product distribution resulting from a hydrocarbon catalytic cracking process in which is employed a silica-alumina cracking catalyst which catalyst has become contaminated with metals during use in said process and which contaminated catalyst in the process has been subjected to at least one regeneration cycle which comprises separating at least a portion of the total catalyst from the process, contacting the separated catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst the resin ratio ranging from 0.25 gram to 1.0 per milliliter of wet cation exchange resin, separating the contacted catalyst from the resin, and returning the contacted catalyst to the hydrocarbon cracking process.

5. A method for improving the product distribution resulting from a hydrocarbon catalytic cracking process in which is employed a silica-alumina cracking catalyst which catalyst has become contaminated with metals during use in said process and which contaminated catalyst in the process has been subjected at least one regeneration cycle which comprises separating at least a portion of the total catalyst from the process, contacting the separated catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 1.0 gram per milliliter of wet cation exchange resin, separating the contacted catalyst from the resin, and returning the contacted catalyst to the hydrocarbon cracking process.

6. The method according to claim 1 wherein the silica-alumina cracking catalyst is a synthetic catalyst and contains from 7 per cent by weight to 30 percent by weight by alumina.

7. The method according to claim 1 wherein the silica-alumina cracking catalyst is a semi-synthetic catalyst and contains from about 30 percent by weight to about 35 percent by weight of alumina.

8. The method according to claim 1 wherein the silica-alumina cracking catalyst is a natural catalyst and contains from about 15 percent by weight to about 50 percent by weight of alumina.

9. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises intimately contacting the silica-alumina catalyst with a cation exchange resin in the hydrogen cycle in an aqueous medium thereby at least partially removing coke forming and gas forming metal contaminants from the catalyst while the stability of the catalyst is substantially maintained and separating the contacted catalyst from the resin.

10. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises intimately contacting the silica-alumina catalyst with a cation exchange resin in the hydrogen cycle in an aqueous medium at a pH such that the coke forming and gas forming metal contaminants are at least partially removed from the catalyst while the stability of the catalyst is substantially maintained and separating the contacted catalyst from the resin.

11. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises contacting the silica-alumina catalyst with a cation exchange resin in the hydrogen cycle in an aqueous medium at a pH ranging from 2.0 to 4.5 with a catalyst to resin ratio ranging from 0.25 gram to 1.0 gram per milliliter of wet cation exchange resin and separating the contacted catalyst from the resin.

12. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises contacting the silica-alumina catalyst with a cation exchange resin in the hydrogen cycle in an aqueous medium at a pH ranging from 2.0 to 4.5 at a temperature ranging from 75° F. to the temperature at which the cation exchange resin disintegrates for from 1 to 24 hours with a catalyst to resin ratio ranging from 0.25 gram to 1.0 gram per milliliter of wet cation exchange resin and separating the contacted catalyst from the resin.

13. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises contacting the silica-alumina catalyst with a cation exchange resin in the hydrogen cycle in an aqueous medium at a pH ranging from 2.7 to 4.2 at a temperature ranging from 120° F. to 250° F. for from 2 to 8 hours with a catalyst to resin ratio ranging from 0.25 gram to 1.0 gram per milliliter of wet cation exchange resin and separating the contacted catalyst from the resin.

14. The method according to claim 9 wherein the silica-alumina cracking catalyst is a synthetic catalyst and contains from 7 percent by weight to 30 percent by weight of alumina.

15. The method according to claim 9 wherein the silica-alumina cracking catalyst is a semi-synthetic catalyst and contains from about 30 percent by weight to about 35 percent by weight of alumina.

16. The method according to claim 9 wherein the silica-alumina cracking catalyst is a natural catalyst and contains from about 15 percent by weight to about 50 percent by weight of alumina.

17. A method for improving the product distribution resulting from a hydrocarbon catalytic cracking process in which is employed a silica-alumina cracking catalyst which catalyst has become contaminated with metals during use in said process and which contaminated catalyst in the process has been subjected to at least one regeneration cycle which comprises separating at least a portion of the total catalyst from the process, contacting the separated catalyst with a cation exchange resin in the hydrogen cycle in an aqueous medium at a pH ranging from 2.0 to 4.5, separating the contacted catalyst from the resin, and returning the contacted catalyst to the hydrocarbon cracking process.

18. A method for improving the product distribution characteristics of a silica-alumina cracking catalyst which catalyst has become contaminated with metals during use in a hydrocarbon catalytic cracking process and which contaminated catalyst in the process has been subjected to at least one regeneration cycle which comprises contacting the silica-alumina catalyst with a cation exchange resin in the hydrogen cycle in an aqueous medium at a pH ranging from 2.0 to 4.5 and separating the contacted catalyst from the resin.

References Cited in the file of this patent

UNITED STATES PATENTS

| | | |
|---|---|---|
| 2,326,323 | Benedict | Aug. 10, 1943 |
| 2,414,736 | Gray | Jan. 21, 1947 |
| 2,566,353 | Mills | Sept. 4, 1951 |

UNITED STATES PATENT OFFICE
CERTIFICATE OF CORRECTION

Patent No. 3,041,270                           June 26, 1962

Leonard N. Leum et al.

It is hereby certified that error appears in the above numbered patent requiring correction and that the said Letters Patent should read as corrected below.

Column 4, line 51, for "aqueuos" read -- aqueous --; column 7, lines 70 and 71, for "employed" read -- employing --; columns 9 and 10, Table I, last column, opposite Experiment No. 6, for "38.6" read -- 38.9 --; column 10, line 65, for "demonstrates" read -- demonstrate --; column 15, lines 4 and 5, for "operated" read -- operating --; column 16, line 6, after "process" insert a comma.

Signed and sealed this 16th day of October 1962.

(SEAL)
Attest:

ERNEST W. SWIDER
Attesting Officer

DAVID L. LADD
Commissioner of Patents